(12) United States Patent
Ohta

(10) Patent No.: US 6,496,646 B1
(45) Date of Patent: Dec. 17, 2002

(54) MAGNETIC RECORDING METHOD AND APPARATUS FOR DIGITAL SIGNALS, MAGNETIC REPRODUCING METHOD AND APPARATUS FOR DIGITAL SIGNALS AND TAPE-SHAPED RECORDING MEDIUM

(75) Inventor: Shuichi Ohta, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/258,774

(22) Filed: Feb. 26, 1999

(30) Foreign Application Priority Data

| Mar. 2, 1998 | (JP) | ............................................ 10-049681 |
| Sep. 25, 1998 | (JP) | ............................................ 10-272137 |

(51) Int. Cl.$^7$ ................................................ H04N 5/91
(52) U.S. Cl. ............................................ 386/46; 386/52
(58) Field of Search ................................ 386/4, 35, 40, 386/52, 64, 78–80, 124, 131; 360/13, 18, 24, 55, 69, 48

(56) References Cited

U.S. PATENT DOCUMENTS

| 5,606,465 A | * | 2/1997 | Cramer | .......................... 360/48 |
| 5,903,406 A | * | 5/1999 | Jeon | ............................ 386/124 |
| 6,122,435 A | * | 9/2000 | Izawa et al. | ................. 386/124 |

* cited by examiner

Primary Examiner—Thai Tran
Assistant Examiner—Christopher Onuaku
(74) Attorney, Agent, or Firm—Frommer Lawrence & Haug LLP; William S. Frommer

(57) ABSTRACT

A recording device for digital signals which is able to record high quality signals for a prolonged time on a magnetic tape by effectively utilizing the production equipments or components of the conventional magnetic tape. The present recording device for digital signals records data of the DV format on a magnetic tape 8 mm in width. For example, data of two tracks of the DV format are recorded on a sole track of the magnetic tape of 8 mm width with a data pattern remaining unchanged.

16 Claims, 14 Drawing Sheets

MAGNETIC RECORDING METHOD AND APPARATUS FOR DIGITAL SIGNALS, MAGNETIC REPRODUCING METHOD AND APPARATUS FOR DIGITAL SIGNALS AND TAPE-SHAPED RECORDING MEDIUM

BACKGROUND OF THE INVENTION

1. Field of the Invention

This invention relates to a magnetic recording method and apparatus and a magnetic reproducing method and apparatus for recording or reproducing digital signals for a magnetic tape, and to a tape-shaped recording medium having digital signals recorded thereon.

2. Description of the Related Art

Recently, a camera built-in type digital video tape recorder for household use, or a floor type digital video tape recorder for household use, for recording digital video signals or digital audio signals on a magnetic tape, have made their debut.

As a recording system for the above digital video tape recorder, there is a format known as a DV system (IEC 61834 helical scan digital video tape cassette recording system using 6.35 mm magnetic tape for consumers (525/60, 625/60, 1125/60 and 1250/50 systems). In this DV system, the tape width of the video tape in use is 6.35 mm (=¼ inch) which is narrower than the tape width of a video tape used in a conventional analog video tape recorder, such as an 8 mm system (IEC 60843 helical scan video tape caseate recording system using 8 mm magnetic tape for consumers).

Notwithstanding, recording for longer time with a higher picture quality is possible with the DV system because the signals for recording are compressed at the same time as the recording density is raised in the DV system.

Meanwhile, the above-mentioned DV system is not compatible with the conventional recording system for an analog video tape recorder. However, if signals of the DV system can be recorded on a video tape of a broader tape width used in this conventional recording system, signals of higher signal quality can be recorded for longer time. Also, if signals of the DV system can be recorded or reproduced for the video tape used in the conventional recording system, it is possible to make effective utilization of resources, such as production equipments for the video tape or component parts used in the conventional recording system.

SUMMARY OF THE INVENTION

It is therefore an object of the present invention to provide a recording method and apparatus for digital signals whereby signals of high signal quality can be recorded on a magnetic tape for prolonged time.

It is another object of the present invention to provide a reproducing method and apparatus whereby high quality long-lasting signals can be reproduced from a magnetic tape through effective utilization of production equipments or component parts for a conventional video tape.

It is yet another object of the present invention to provide a tape-shaped recording medium having high quality signals recorded thereon.

In one aspect, the present invention provides a magnetic recording apparatus for digital signals including recording data generating means for generating recording data associated with a digital recording format applied to a first magnetic tape of a pre-set tape width, and recording means for recording the recording data generated by the recording data generating means on a second magnetic tape having a tape width broader than that of the first magnetic tape. The recording means records at least two tracks of the recording data in the digital recording format generated by the recording data generating means in succession on a sole track formed on the second magnetic tape.

In this magnetic recording apparatus for digital signals, at least two tracks of the recording data in the digital recording format applied to a first magnetic tape are recorded with a data pattern of the digital recording format in succession on a sole track formed in a second magnetic tape having a tape width broader than that of the first magnetic tape.

In another aspect, the present invention provides a magnetic recording method for digital signals including generating recording data associated with a digital recording format applied to a first magnetic tape of a pre-set tape width, and recording at least two tracks of recording data in the digital recording format on a sole track formed on a second magnetic tape having a tape width broader than that of the first magnetic tape.

In this magnetic recording method for digital signals, at least two tracks of the recording data in the digital recording format applied to a first magnetic tape are recorded with a data pattern of the digital recording format in succession on a sole track formed in a second magnetic tape having a tape width broader than that of the first magnetic tape.

In a further aspect, the present invention provides a magnetic reproducing apparatus for digital signals including reproducing means for reproducing recording data associated with a digital recording format applied to a first magnetic tape of a predetermined tape width from a second magnetic tape of a tape width broader than the predetermined tape width carrying the recording data, and data processing means for processing the recording data reproduced by the reproducing means. The reproducing means reproduces at least two tracks of the recording data of the digital recording format in succession from a sole track formed on the second magnetic tape.

In this magnetic reproducing apparatus for digital signals, at least two tracks of the recording data in the digital recording format applied to a first magnetic tape are recorded with a data pattern of the digital recording format in succession on a sole track formed in a second magnetic tape having a tape width broader than that of the first magnetic tape.

In a further aspect, the present invention provides a magnetic reproducing method including reproducing at least two tracks of data in the digital recording format in succession from a sole track formed on a second magnetic tape carrying recording signals of the digital recording format applied to a first magnetic tape of a predetermined tape width, the second magnetic tape having a tape width broader than the predetermined tape width, and processing reproduced recording data.

In this magnetic reproducing method for digital signals, at least two tracks of the recording data in the digital recording format applied to a first magnetic tape are recorded with a data pattern of the digital recording format in succession on a sole track formed in a second magnetic tape having a tape width broader than that of the first magnetic tape.

In yet another aspect, the present invention provides a tape-shaped recording medium having recorded thereon recording data associated with the digital recording format applied to a first magnetic tape of a predetermined tape width, with the tape-shaped recording medium having a width broader than the predetermined tape width, at least two tracks of the digital recording format being recorded on a sole recording track.

According to the present invention, a least two tracks in the digital recording format applied to the first magnetic tape are recorded or reproduced in succession to or from a sole track formed on a second magnetic tape broader in tape width than the first magnetic tape. According to the present invention, data of longer duration and with higher quality can be recorded on the second magnetic tape, at the same time as resources such as conventional production equipment or components can be exploited effectively.

DESCRIPTION OF THE PREFERRED EMBODIMENTS

First, a recording system of recording video data or audio data on a magnetic tape as a tape-shaped data recording medium is explained by way of a first embodiment of the present invention. The recording system of the present invention is a so-called DV system for recording digital signals on a magnetic tape having a tape width of 8 mm, and herein termed a digital 8 mm system. The recording system according to the present invention is hereinafter explained in comparison with the DV system (IEC 61834) and the 8 mm system (IEC 60843) which are hitherto known recording systems.

Figure 1:
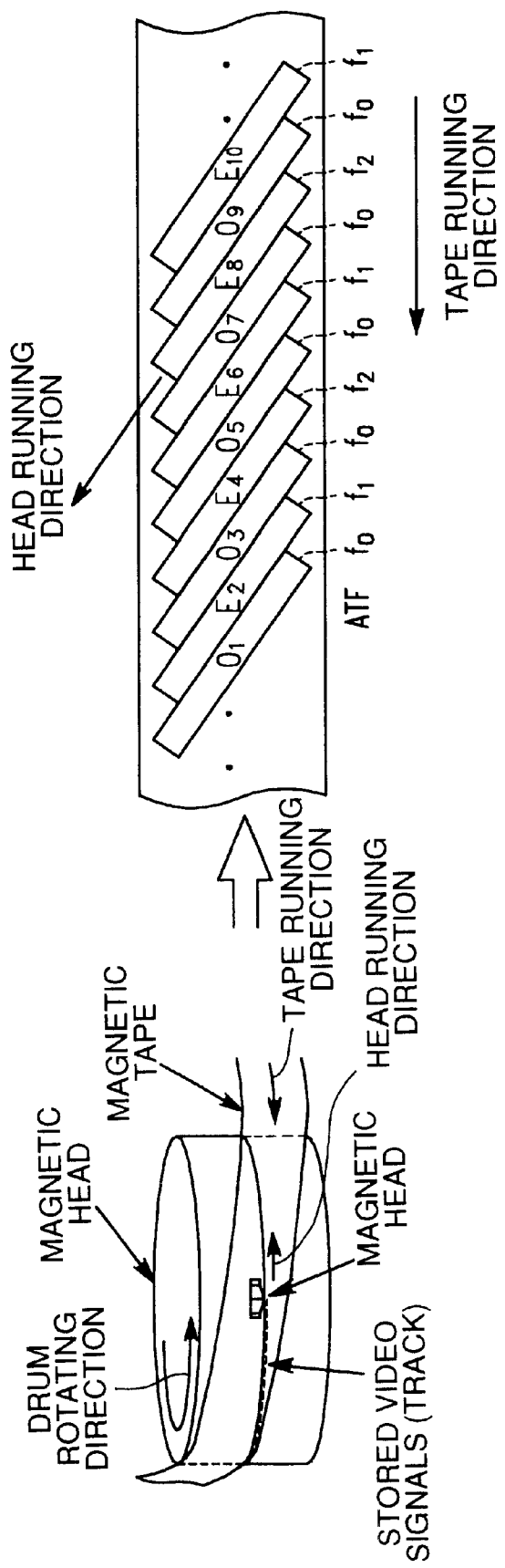
FIG. 1 shows a track pattern n case digital signals of the DV system have been recorded on a magnetic tape of 6.35 mm tape width used in the DV system.

FIG. 1 shows a track pattern when the digital signals of the DV system are recorded on a magnetic tape of a tape width of 6.35 mm used in the DV system. This magnetic tape is hereinafter termed a DV tape.

In the DV system, video signals etc are recorded by a rotary drum on a DV tape having a tape width of 6.35 mm (=¼ inch). On this rotary drum are mounted two magnetic heads with different azimuth angles at an angular distance of 180° to each other. These two magnetic heads are run at a pre-set angle relative to the running direction of the DV tape to form a track pattern shown in FIG. 1. If, in the present DV system, the tracks recorded by one of the magnetic heads are odd tracks O1, O3, O5, O7 and O9, and the tracks recorded by the other magnetic head are even tracks E2, E4, E6, E8 and E10, one frame of video signals conforming to the NTSC system are recorded in five odd tracks and five even tracks, totalling 10 tracks. With the PAL system, one frame of video signals is recorded in a total of 12 tracks.

Figure 2:
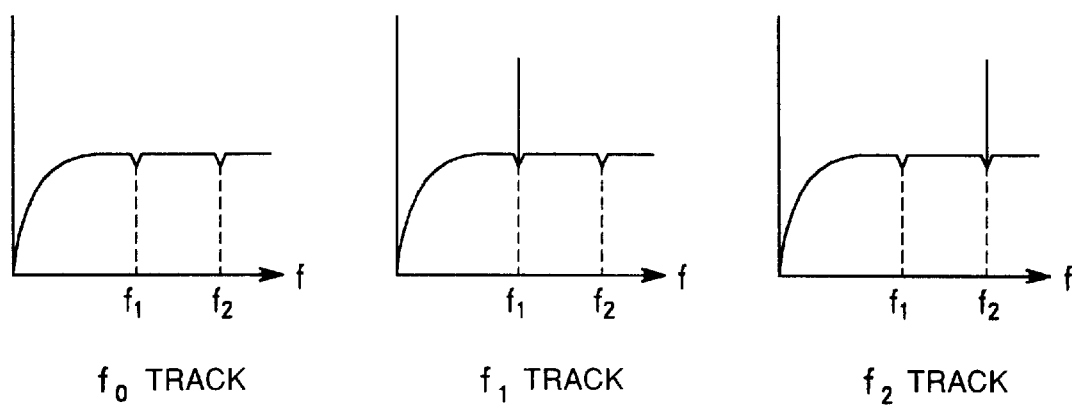
FIG. 2 shows a spectrum of pilot signals superimposed on data of each track.

Also, in the present DV system, the totality of data recorded in the respective tracks are processed with 24/25 conversion whereby pilot signals for ATF (automatic track finding) are superimposed on the entire track. The magnetic head tracking can be achieved by detecting these pilot signals during reproduction. With the 24/25 conversion, an extra bit (1 bit) is inserted every 24 bits of data to superimpose low-range pilot components of three frequencies into a string of data for recording. Specifically, the pilot signals of the frequencies f0, f1, f2 which will satisfy the spectra of FIG. 2, with the run length of the data for recording being 9 or less, are superimposed on the respective tracks. In the present DV system, the pilot signals of the frequency f0 are superimposed on the odd tracks O1, O3, O5, O7 and O9, while the pilot signals of the frequencies f1, f2 are alternately superimposed on the even tracks E2, E4, E6, E8 and E10. Therefore, the pilot signals of the recurrent frequencies . . . f0, f1, f0, f2, f0, f1, f0, f2, . . . are recorded on the respective tracks. Thus, when the track having the recorded frequency f0 is scanned by the magnetic head, the pilot components with the frequencies f1, f2 can be obtained as crosstalk signals from the neighboring tracks, by recording these pilot signals, so that stable tracking can be applied at the time of reproduction.

Figure 3:
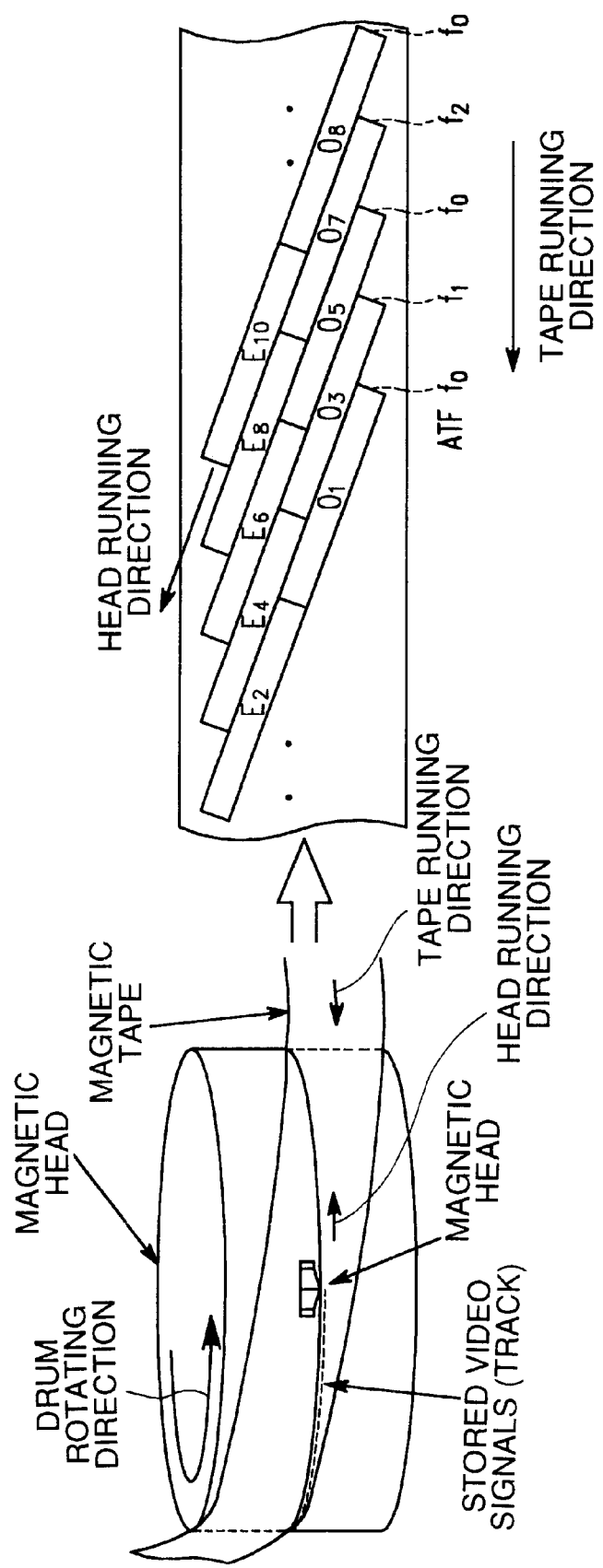
FIG. 3 shows a track pattern when digital signals of a recording system embodying the present invention for recording video and audio data on a magnetic tape are recorded on a magnetic tape of a 8 mm tape width.

FIG. 3 shows a track pattern when the digital signals of the digital 8 mm system according to the present invention are recorded on a magnetic tape having a tape width of 8 mm. This tape is hereinafter termed an 8 mm tape.

In the digital 8 mm system, digital video signals etc are rotationally recorded on the 8 mm tape broader in tape width than the DV tape. This 8 mm tape is the same as the magnetic tape used in the 8 mm system (IEC 60843) adapted for recording the conventional analog video signals. A rotary drum for rotational recording has two magnetic heads, for example, having different azimuth angles, at diametrically opposite positions on either sides of the center of rotation, as in the conventional analog 8 mm system. Thus, the two magnetic heads are scanned at a predetermined angle relative to the running direction of the 8 mm tape, to form a track pattern shown in FIG. 3.

It is noted that, in the digital 8 mm system, two-track data in the DV system are consecutively recorded, in its data pattern of the DV system, on one track of the 8 mm tape. That is, in the digital 8 mm system, odd-track data and even-track data of the DV system are grouped in one set and recorded on one track without changing the data contents.

For example, in a digital 8 mm system, data of the odd track O1 and data of the even track E2 in the DV system are grouped in a set and recorded in one track. In the next track, data of the odd track O3 and data of the even track E4, grouped in a set, are recorded. Similarly, data of two consecutive tracks in the DV system, arranged in sets, are recorded on respective consecutive tracks on the 8 mm tape, such as odd track O5 and even track E6, odd track O7 and even track E8, odd track O9 and even track E10, and so forth.

Thus, in the digital 8 mm system, one frame of video signals associated with the NTSC system is recorded on five tracks of an 8 mm tape, while one frame of video signals associated with the PAL system is recorded on six tracks of the 8 mm tape.

Meanwhile, in this digital 8 mm system, extension data is recorded, along with two-track data in the DV system, on a sole track of an 8 mm tape.

Also, in the digital 8 mm system, pilot signals of the three frequencies f0, f1, f2 for ATF are superimposed on the respective tracks by the 24/25 conversion. That is, pilot signals of different frequencies are recorded every track in the digital 8 mm system and every two tracks in the DV system. Specifically, pilot signals of repetitive frequencies . . . f0, f1, f0, f2, f0, f1, f0, f2, . . . are recorded for each track made up of a set of data of even tracks and odd tracks in the DV system. Thus, when a track carrying the recorded frequency f0 is scanned by the magnetic head, the pilot components of the frequencies f1, f2 can be obtained from the neighboring tracks as cross-talk signals, thus enabling stable tracking to be applied during reproduction, the pilot signals are also recorded on the extension data. The pilot signals recorded on the extension data are of the same frequency as that of the two-track data of the DV system recorded on the track.

Figure 4:
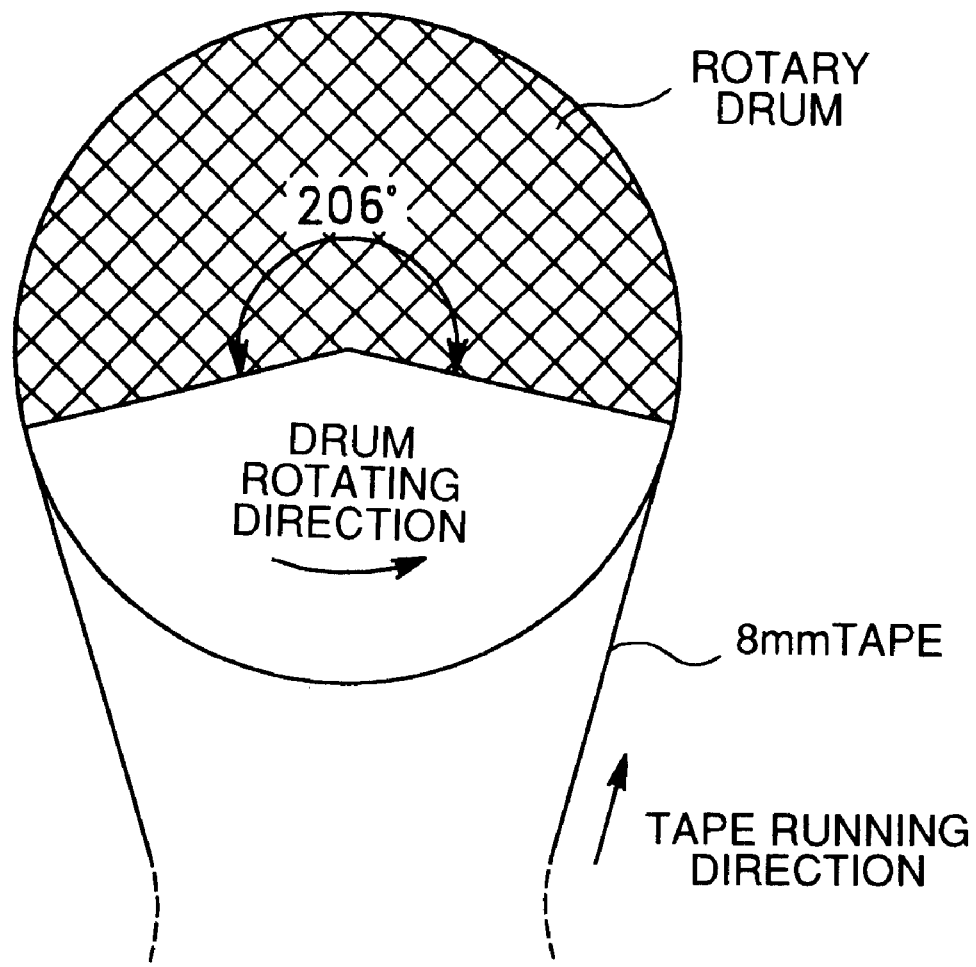
FIG. 4 illustrates a tape wrap angle on a rotary drum in the recording system embodying the present invention.

FIG. 4 illustrates the tape wrap angle on the rotary drum in the digital 8 mm system.

Referring to FIG. 4, an 8 mm tape is wrapped on a rotary drum through an angular extent of 206°. The signals recorded when the magnetic head is moved through the wrap angle of 206° constitute one track on the 8 mm tape. Meanwhile, the 8 mm tape wrap angle may also be 211°, as in the conventional analog 8 mm system, so that signals will be recorded in a 206° portion of the total wrap angle.

Figure 5:
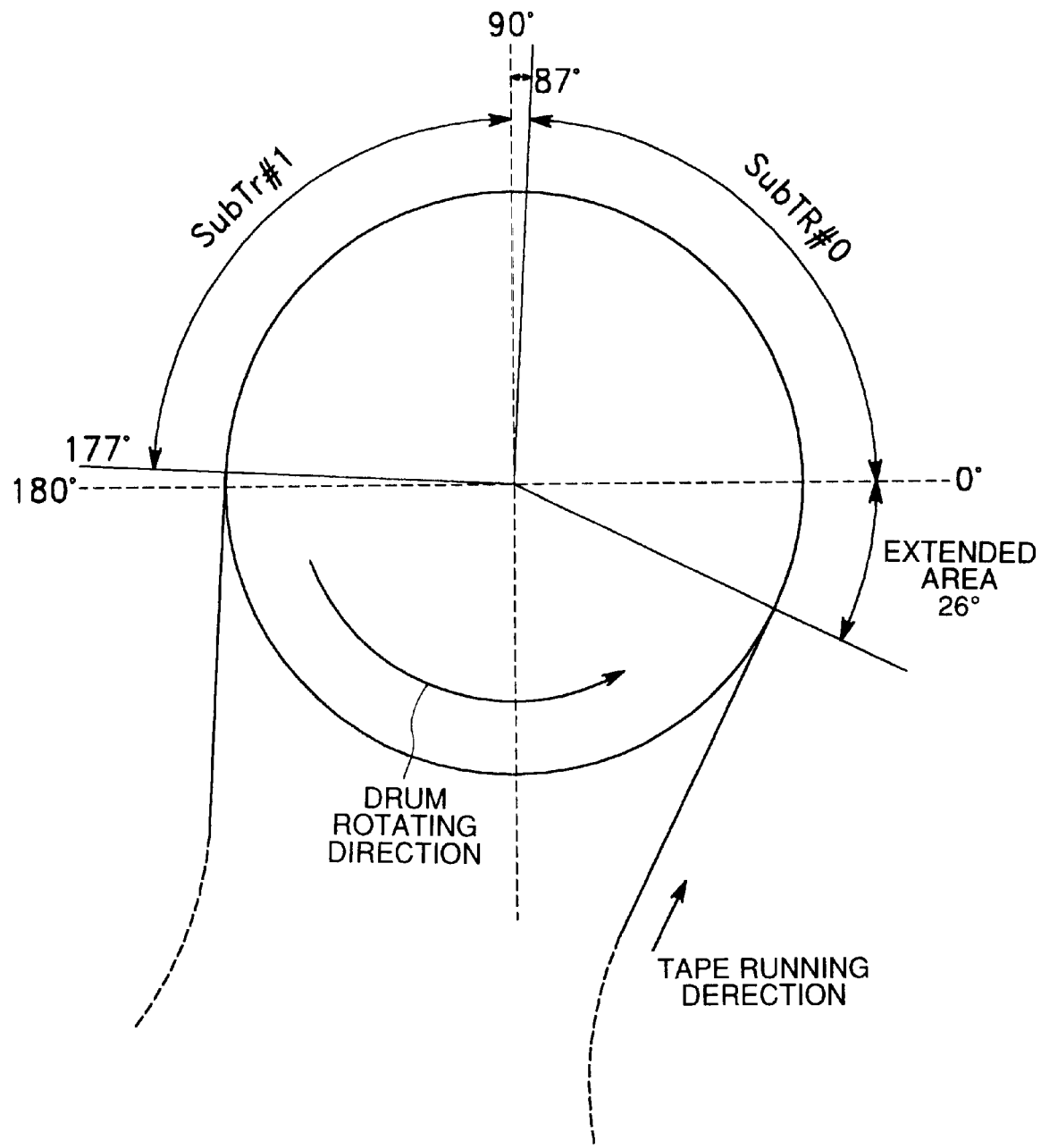
FIG. 5 illustrates an effective wrap angle in one track in a recording system embodying the present invention.
Figure 6:
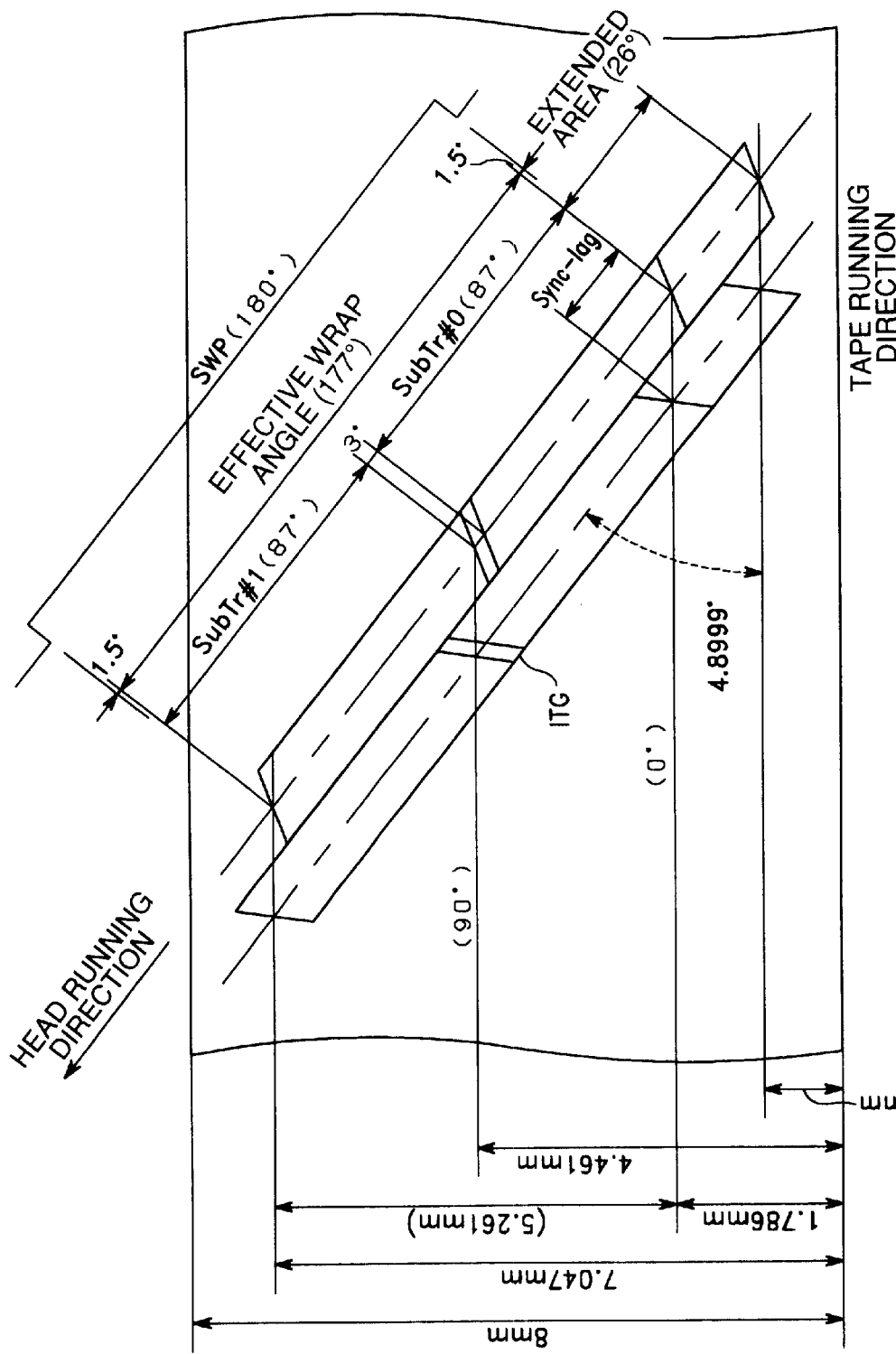
FIG. 6 illustrates a track pattern on a tape in the recording system embodying the present invention.

FIGS. 5 and 6 illustrate an effective wrap angle in one track in the digital 8 mm and a track pattern on a tape in the digital 8 mm system, respectively.

In the digital 8 mm system, the effective wrap angle is 177°, as shown in FIGS. 5 and 6. In this effective wrap angle, there are provided two sub-tracks (SubTr#0, SubTr#1). Each sub-track is formed in a range of the wrap angle of 87°, with one-track data in the DV system being recorded in its data format of the DV system. That is, one track each of the above-mentioned odd track data and even track data are consecutively recorded within the above-mentioned effective wrap angle. Within the effective wrap angle, a gap of 3° (inter-track gap or ITG) is provided between two sub-tracks.

In the digital 8 mm system, there is provided an extension area at the upstream side of the effective wrap angle, that is at the head intruding side of the track. Therefore, the wrap angle of a sole track is the wrap angle of the extension area of 20° and the effective wrap angle of 177°, summed together, or 206°.

Also, in the digital 8 mm system, two magnetic heads provided on a rotary drum are switched by a switching pulse SWP generated in synchronism with the rotational phase of the rotary drum. At a time point recording of data in the effective wrap angle of one of the magnetic heads, such as Ach, comes to a close, the switching pulse SWP is switched to start recording of data within the effective wrap angle of the other magnetic head, such as Bch. Since the switching pulse SWP is switched each time the rotary drum is rotated 180°, there are produced margins of 1.5° ahead and in back of the effective wrap angle.

Meanwhile, data of the extension area portion is synchronized by a extension track synchronization information (Ex-ITI) as later explained or by a track synchronization information (ITI) of a previous track, so that recording is started before switching of the switching pulse SWP.

In the digital 8 mm system, the track angle of a track formed on the 8 mm tape, that is an angle between the head running direction and the tape running direction is 4.8999°. The width of the 8 mm tape from one end of the longitudinal head intruding side to the recording start position of the extension area is 1.013 mm. On the other hand, the width from a longitudinal end of the 8 mm tape on the head entrance side to the recording start position of the effective wrap angle is 1.786 mm. The width from the longitudinal end of the 8 mm tape on the tape entrance side to the recording end position of the effective wrap angle is 7.047 mm. The width from the recording start position of the effective wrap angle to the recording end position of the effective wrap angle is 5.261 mm. The width from one longitudinal end of the 8 mm tape towards the head entrance side to a center position of the effective wrap angle, that is the recording start position of the sub-track SubTr#1 is 4.461 mm. Meanwhile, the above-given widths on the 8 mm tape stand for the distance as measured in a direction perpendicular to the tape running direction.

Typical specifications of the recording system for the magnetic tape embodying the present invention are shown in the following Tables in association with the NTSC and PAL systems. For comparison, the specifications of the conventional analog 8 mm system are also shown.

TABLE 1

| | specifications of a digital 8 mm system of the inventive embodiment | | specifications of the conventional analog 8 mm system |
|---|---|---|---|
| | NTSC 525/60 | PAL 625/50 | NTSC |
| drum diameter (mm) | 40 | 40 | 40 |
| drum number of revolutions per sec | 75/1.001 | 75 | 30/1.001 |
| track./drum rotation | 2 | 2 | 2 |
| track/frame | 5 | 6 | 2 |
| drum lead angle (°) | 4.885 | 4.885 | 4.885 |
| recording track angle (°) | 4.8999 | 4.8999 | 4.9037 |
| track length (177°, mm) | 61.597 | 61.597 | 62.593 (180°, mm) |

TABLE 2

| | specifications of a digital 8 mm system of the inventive embodiment | | specifications of the conventional analog 8 mm system |
|---|---|---|---|
| | NTSC 525/60 | PAL 625/50 | NTSC |
| effective wrap angle (°) | 177 | 177 | 180 |
| head azimuth Ach (°) | +10 | +10 | +10 |
| head azimuth Bch (°) | −10 | −10 | −10 |
| tape width (mm) | 8 | 8 | 8 |
| recording start tape height (mm) | 1.786 | 1.786 | 1.786 |
| recording end tape height (mm) | 7.047 | 7.047 | 7.137 |
| effective recording width (mm) | (5.261) | (5.261) | 5.351 |

TABLE 3

| | specifications of a digital 8 mm system of the inventive embodiment | | specifications of the conventional analog 8 mm system |
|---|---|---|---|
| | NTSC 525/60 | PAL 625/50 | NTSC |
| track pitch ($\mu$m) | 16.340 | 16.340 | 20.5 (SP) |
| tape speed (mm/sec) | 28.965/1.001 | 28.695 | 14.345 |
| relative speed (mm/sec) | 9.3962/1.001 | 9.3962 | 3.75 |
| shortest recording wavelength ($\mu$m) | 0.449/1.001 | 0.449 | 0.37 (Hi8, NTSC) |
| recording rate (Mbps) | 41.85 | 41.85 | — |
| data (bits) | 274624 | 274350 | — |
| Sync-lag ($\mu$sec) | 20.305 | 20.285 | — |

In the recording system for a magnetic tape according to the present invention, since the two-tape data of the DV system are consecutively recorded in one track, with the data pattern remaining unchanged, thus enabling the tape area to be used effectively to enable recording for longer time. In other words, the necessary tape length can be shortened for the same recording time, as compared to the case of recording DV track patterns one by one on an 8 mm tape, thus improving tape consumption.

Of course, this recording system is merely illustrative, such that three, four or more tracks of the DV system can be recorded in succession in one track. This enables recording over a longer time. For recording over the same time duration, the necessary tape length can be shortened further.

With the present recording system, it is possible to use a mechanical deck of a conventional analog 8 mm video tape recorder directly as a recording/reproducing apparatus, subject to change of the drum rpm from 1800 rpm to 4500 rpm, to produce the above-mentioned track pattern for the 8 mm tape.

Meanwhile, the capstan speed, that is the tape feed rate, merely sets the track pitch. The required track pitch is an item that may be occasionally determined depending the characteristics of a tape or a head or on compatibility.

The data format of data recorded in the effective wrap angle and the data format of data recorded in the extension area are explained in greater detail. Meanwhile, an area within the effective wrap angle is termed a usual area in contradistinction to the extension area.

Figure 7:
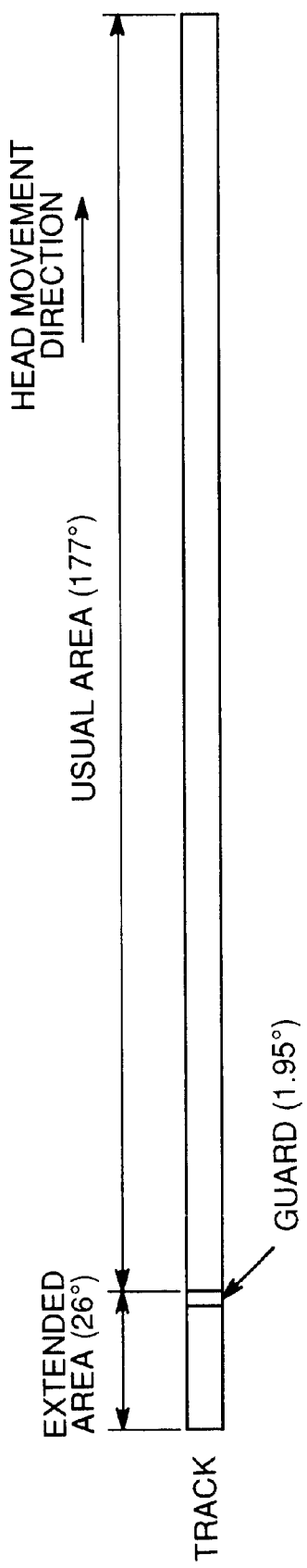
FIG. 7 illustrates a data pattern of a track in a recording system embodying the present invention.

In the digital 8 mm system, a guard area (Guard) is provided between the extension area and the usual area, as shown in FIG. 7. For this guard area, the wrap angle is 1.95°.

Figure 8:
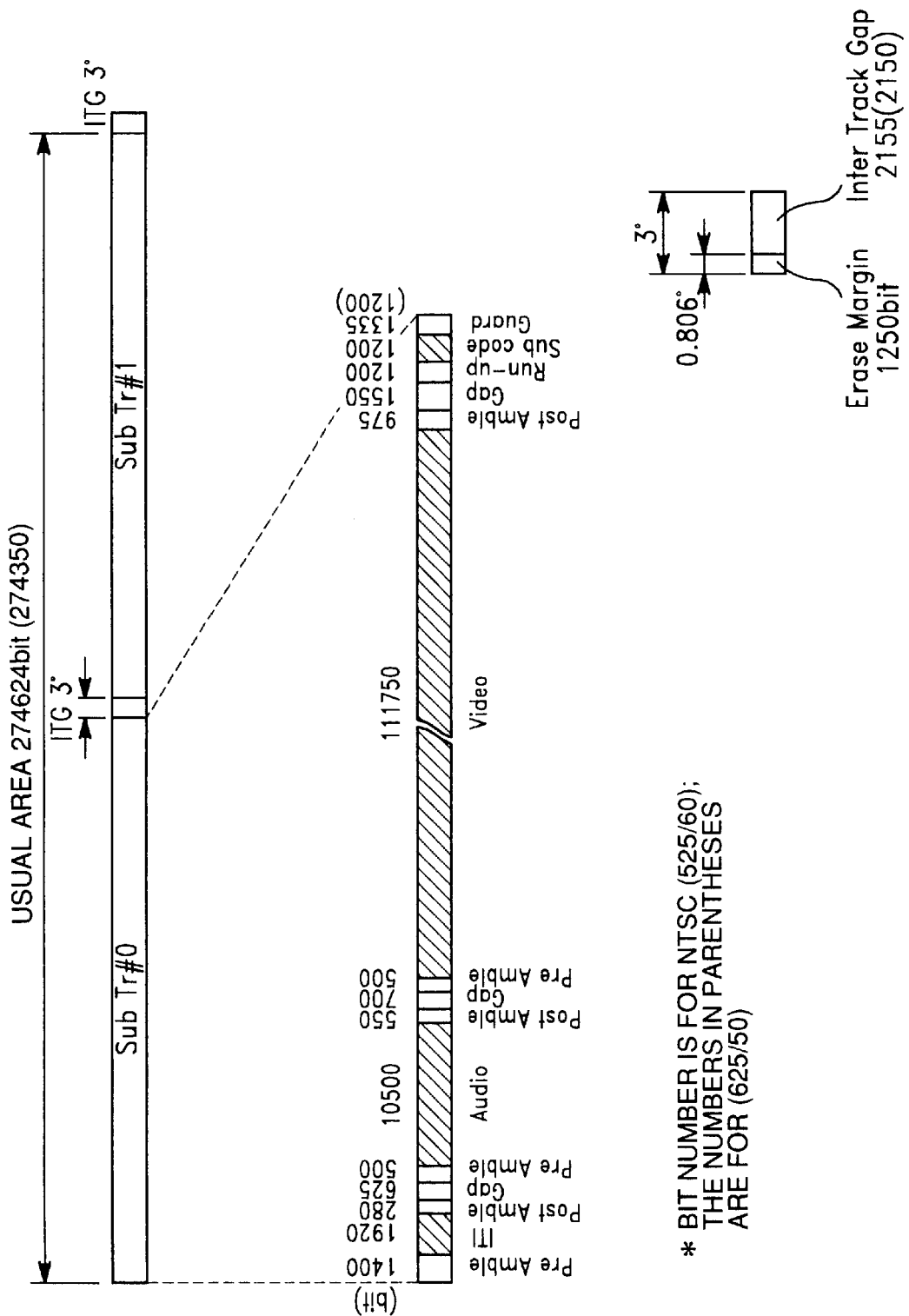
FIG. 8 illustrates a data pattern of a usual area in a track in a recording system embodying the present invention.

Referring to FIG. 8, the usual area is made up of a first sub-track SubTr#0, in which one-track data of the DV system is recorded with the DV system data pattern unchanged, a gap ITG, and a second sub-track SubTr#1, in which one-track data of the DV system is recorded. In this usual area are recorded data of 274624 bits and 274350 bits in the NTSC system and in the PAL system, respectively.

In the NTSC system, there are sequentially recorded, in the first sub-track SubTr#0, as from the head entrance side, a preamble (1400 bits), track synchronization information (1920 bits of the insert and track information or ITI), postamble (280 bits), gap (625 bits), preamble (500 bits), audio data (1050 bits), postamble (550 bits), gap (700 bits), preamble (500 bits), video data (111750 bits), postamble (975 bits), gap (1550 bits), run-up (1200 bits), sub-code (1200 bits) and a guard area (1200 bits). In the PAL system, the last guard area is 1335 bits. Meanwhile, the data recorded in the first sub-track SubTr#0 is the same data as that recorded in one track in the DV system.

In the second sub-track SubTr#0, the same data as the data recorded in the first sub-track are recorded.

In the gap ITG, there are provided an erasure margin of 1250 bits and a gap of 2150 bits (2155 in PAL).

In the NTSC system, there are sequentially recorded, in the extension area, as from the head entrance side, a preamble (1400 bits), extension track synchronization information (Ex-ITI, 1920 bits), postamble (280 bits), gap (2325 bits), preamble (500 bits), first extension data (Ex-DATA, 10500 bits), postamble (550 bits), gap (2325 bits), preamble (500 bits), second extension data (Ex-DATA, 10500 bits), postamble (550 bits), gap (2325 bits), run-up (1200 bits), extension subcodes (Ex-Subcode, 1200 bits), guard area (1200 bits), and gap (3065 bits). In the PAL system, the last guard area is 1335 bits.

Similarly to the track synchronization information of the DV system, the extension track synchronization information of the extended area is used as reference for the time axis and tracking servo. Also, similarly to the subcode of the DV system, the extension subcode of the extension area is used as the ancillary information for video or audio data.

In the first and second extension data areas, there can be recorded audio data of the same structure as the audio data region of the usual area. Thus, audio data an be independently recorded in the extension area separately from the usual area, thus assuring facilitated post-recording. If the audio data is recorded in the extension area, it is possible to record the time code of recorded audio data or the switching information with respect to the audio data of the usual area.

In the extension data region, there can also be recorded the telop information, still pictures and the other digital information.

By providing this extension area, audio data or video data can be post-recorded in the digital 8 mm system without overwriting the data recorded in the usual area. In particular, by having sufficient gap and the track synchronization information for data of the extension area, post-recording can be performed reliably. In the DV system, in which the sub-code is at a rearward portion of the track, it is difficult to rewrite the subcode alone due to linearity. Since the subcode of the extension area is now provided in the vicinity of the extension ITI, the subcode by itself can be rewritten easily.

Figure 10:
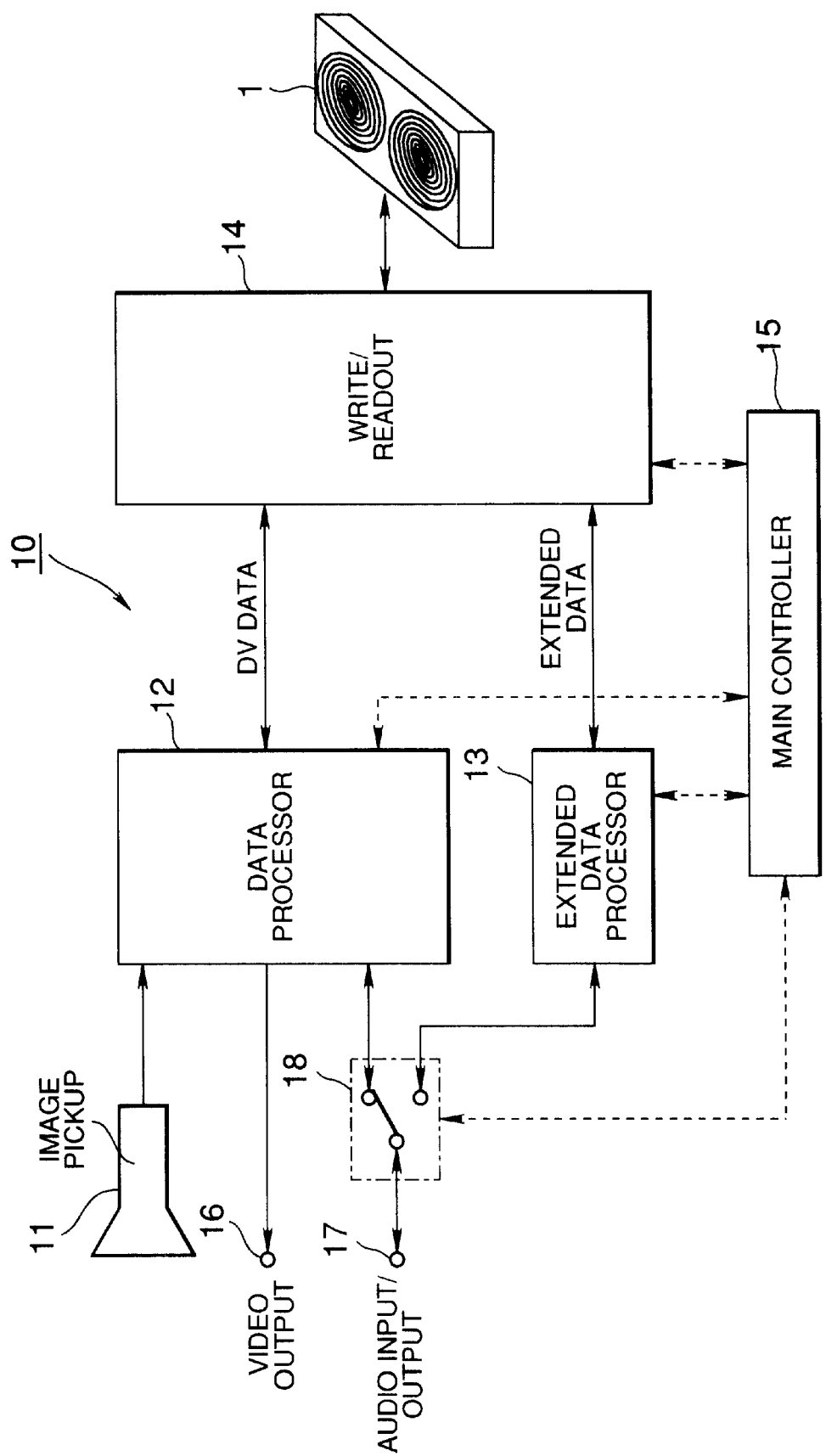
FIG. 10 is a block diagram of a recording/reproducing apparatus embodying the present invention.

A recording/reproducing apparatus for recording video data and audio data using the above-described digital 8 mm system is hereinafter explained. FIG. 10 shows a schematic structure of a recording/reproducing apparatus 10 embodying the present invention.

The recording/reproducing apparatus, embodying the present invention, is a so-called camera built-in type video tape recorder configured for recording video data etc constructed in accordance with the above-mentioned digital 8 mm system on an 8 mm tape 1 and for reproducing the video data etc from the 8 mm tape 1.

The recording/reproducing apparatus 10, embodying the present invention, includes an image pickup unit 11, for imaging an object to output analog video signals, a DV data processor 12 for converting DV data read out from the 8 mm tape 1 into analog video signals, an extension data processor 13 for generating extension data for recording on the extension area of the 8 mm tape 1 and for processing the extension data read out from the extension area of the 8 mm tape 1, a write/readout unit 14 for writing and reading out data for the 8 mm tape 1, and a main controller 15 for controlling various components. The recording/reproducing apparatus 10 also includes a video output terminal 16 at which the analog video signals are outputted, an audio input/output terminal 17 at which analog signals are inputted or outputted, and a switch 18 for switching between the DV data processor 12 and the extension data processor 13 to output the audio signals entering the audio input/output terminal 17 at the selected processor and for switching between the audio signals outputted by the DV data processor 12 and the audio signals outputted by the extension data processor 13 to send the selected audio signals at the audio input/output terminal.

The image pickup unit 11 is made up of an optical system, such as lenses, a CCD and an electrical system, such as a signal processing circuit. This image pickup unit 11 generates analog video signals (luminance signals, red color difference signals and blue color difference signals) to send the analog video signals to the DV data processor 12.

During recording, the DV data processor 12 is fed with analog video signals, sent from the image pickup unit 11, analog audio signals, sent from outside via the audio input/output terminal 17, and the ancillary information sent from the main controller. During recording, the DV data processor 12 converts the format of these signals or the information into a data format conforming to the DV system shown in FIG. 8 and sends the signals etc sent thereto to the write/readout unit 14 in terms of one-track data in the DV system, that is data written in the sub-track SubTr#0 or SubTr#1, as a unit. Also, during reproduction, the DV data processor 12 is fed from the write/readout unit 14 with DV data read out from the usual area of the 8 mm tape 1, that is from within the effective wrap angle. During reproduction, the DV data processor 12 splits the DV data into video data, audio data and the ancillary information. The DV data processor 12 converts the split video data into analog video data which is outputted via the video output terminal 16 to outside. The DV data processor 12 converts the split audio data into analog audio signals which are outputted via audio input/output terminal 17. The DV data processor 12 also sends the split ancillary information to the main controller 15.

Figure 9:
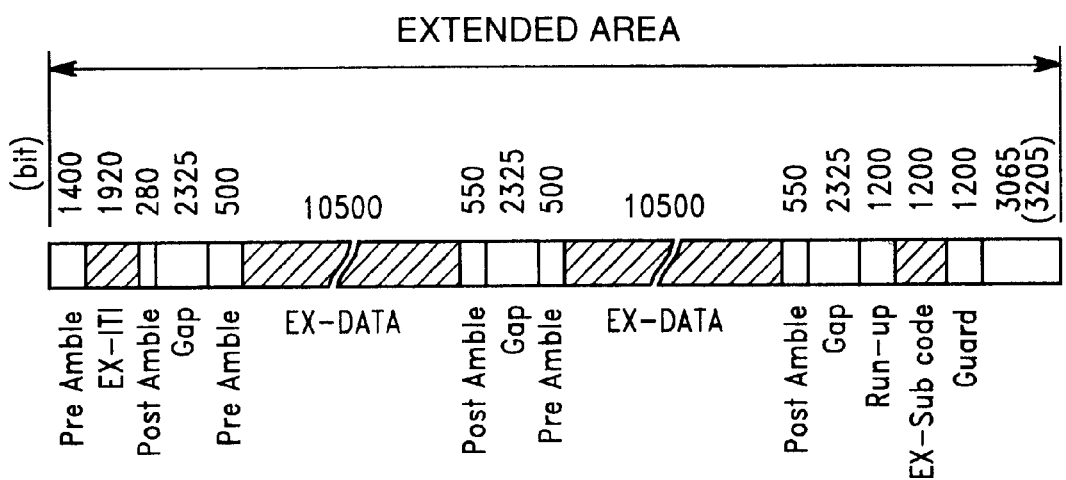
FIG. 9 illustrates a data pattern of an extended area of a track in a recording system embodying the present invention.

During recording or audio post-recording, the extension data processor 13 is fed with audio signals sent from outside via audio input/output terminal 17 and with the ancillary information sent from the main controller. The extension data processor 13 converts the format of these signals etc into data format suitable for recording in the extension area shown in FIG. 9 to send the converted signals etc to the write/readout unit 14 as the extension data for recording in the extension area. During reproduction, the extension data processor 13 is also fed from the write/readout unit 14 with the extension data read out from the extension area of the 8 mm tape. The extension data processor 13 splits the audio data and the ancillary information from the extension data. The extension data processor 13 converts the split audio data into analog audio signals which are outputted via the audio input/output terminal 17. The extension data processor 13 also sends the split ancillary information to the main controller 15.

Meanwhile, the extension data processor 13 records the pilot signals by performing 24/25 conversion on the extension data to be recorded. These pilot signals are of the same frequency as that of the pilot signals recorded in the DV data to be recorded on a track.

If audio signals are to be recorded during recording in the audio region in the usual area, the switch 18 sets its terminal to the side of the DV data processor 12 to send the audio signals to the DV data processor 12. If audio data is to be recorded in the extension data region in the extension area during recording or during post-recording, the switch 18 sets its terminal to the side of the extension data processor 13 to send the audio signals to the extension data processor 13. If audio data of the usual area is to be outputted during reproduction, the switch 18 sets its terminal to the side of the DV data processor 12 to send the audio signals outputted by the DV data processor 12 at the audio input/output terminal. If the audio data in the extension area is to be outputted during reproduction, the switch 18 sets its terminal to the side of the extension data processor 13 to send the audio signals outputted by the extension data processor 13 at the audio input/output terminal.

The write/readout unit 14 performs switching control of the magnetic head, rotation control of the rotary drum and the running speed of the 8 mm tape 1 to write/read out the DV data and the extension data for the usual area and the extension area.

The main controller 15 controls the DV data processor 12, extension data processor 13 and the write/readout unit 14, generates the ancillary information sent to the DV data processor 12 and to the extension data processor 13 and processes the ancillary information read out from the 8 mm tape 1. The main controller 15 also performs the changeover operation for the switch 18.

The structure and the processing contents of the DV data processor 12 are further explained in detail.

Figure 11:
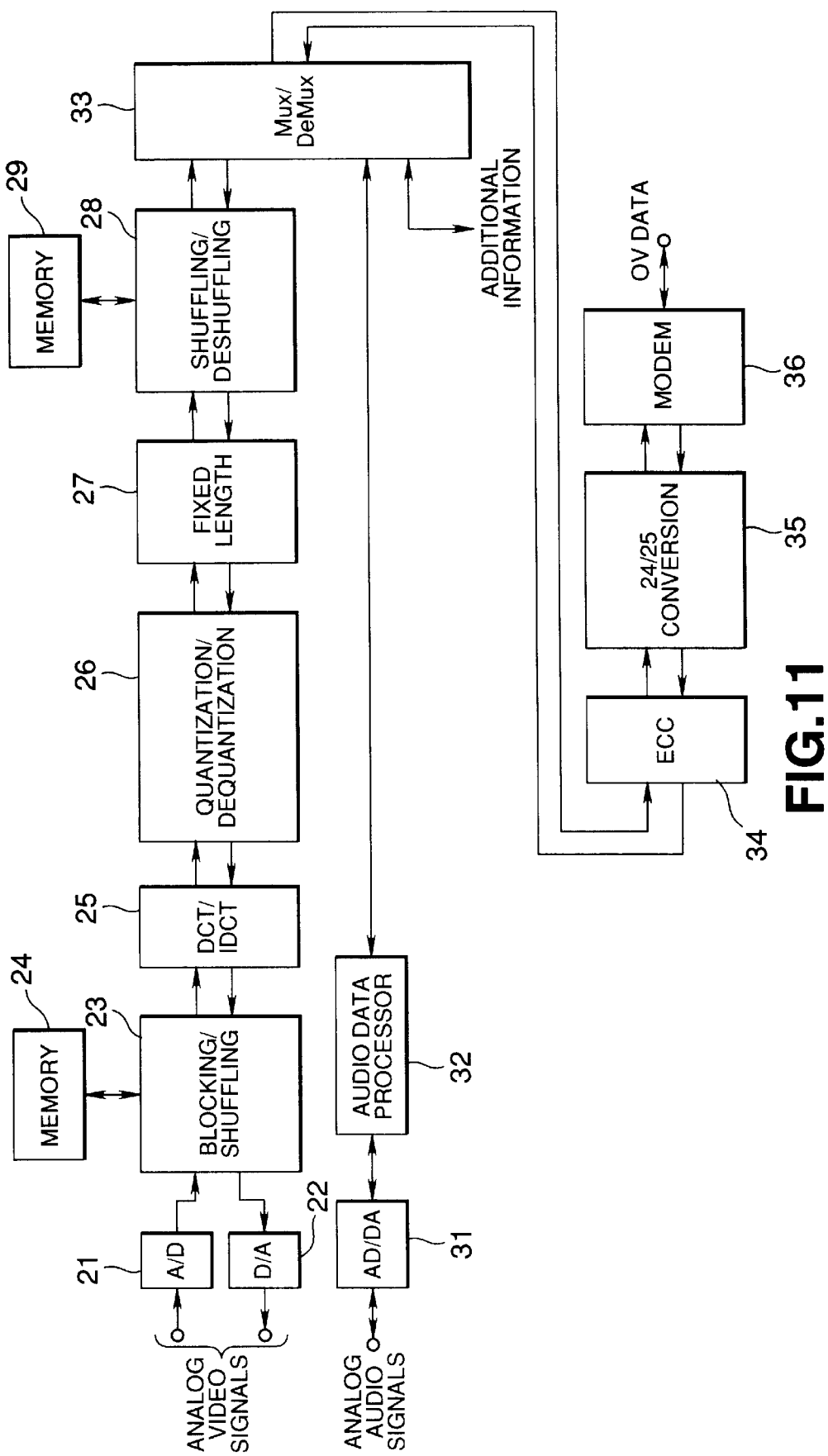
FIG. 11 is a block diagram of a DV data processing unit of a recording/reproducing apparatus embodying the present invention.

FIG. 11 is a block diagram of the DV data processor 12.

The DV data processor 12 includes an A/D converter 21, a D/A converter 22, a blocking/shuffling unit 23, a memory 24, a discrete cosine transform/inverted discrete cosine transform (DCT/IDCT) unit 25, a quantizer/dequantizer 26, a fixed length unit 27, a shuffling/deshuffling unit 28, a memory 29, an AD/DA converter 31, an audio data processor 32, a multiplexer/demultiplexer 33, an ECC unit 34, a 24/25 converter 35 and a modulator/demodulator 36.

The contents of processing by the DV data processor 12 during recording is first explained.

The analog video signals (luminance signals, red color difference signals and blue color difference signals) sent from the image pickup unit 11 are converted by the A/D converter 21 to digital data. The video data, digitized by the A/D converter 21, are sent to the blocking/shuffling unit 23.

The blocking/shuffling unit 23 processes the video data with blocking and shuffling. The blocking is the processing of splitting the video data (luminance signals, red color difference signals and blue color difference signals) into 88 pixel blocks as basic units for discrete cosine transform (DCT). Four blocks of the luminance data Y and one bloc each of color difference data CR, CB, totalling at six blocks, are handled as a processing unit termed a macro-block. The processing of shuffling interchanges data every five macro-blocks so that the data quantity will be averaged in the picture. The blocking and shuffling are performed on the memory 24. Following the blocking and the shuffling, the video data are sent to the DCT/IDCT unit 25.

The DCT/IDCT unit 25 processes the input video data with DCT to orthogonal-transform the video data to send the resulting video data to the quantizer/dequantizer 26.

The quantizer/dequantizer 26 divides the DCT coefficients with an integer termed a quantization step by way of performing quantization. Specifically, the quantization step which will give the maximum number of bits following the quantization which is not in excess of the target number of bits for quantization is selected and used for quantization. The quantizer/dequantizer 26 also zig-zag scans the DCT coefficients, quantized on the block basis, from the data of the dc components, by way of performing variable length coding. The video data from the quantization and variable length encoding processes are sent to the fixed length forming unit 27.

The fixed length forming unit 27 packs the input video data every five sync blocks. The sync block means a small region obtained on subdivision of the track of the magnetic tape (8 mm tape 1 and DV tape). Specifically, the recording area of the track on the magnetic tape is subdivided into small regions termed sync blocks. It is into this unit that the video data is packed. In the DV system, the number of blocks in one track is 135. In the digital 8 mm system, embodying the present invention, in which two-track data in the DV system are recorded in one track, the number of sync blocks contained in one track is twice 135, or 270. The video data, packed every five sync blocks, are sent to the shuffling/deshuffling unit 28.

The shuffling/deshuffling unit 28 interchanges the video data, packed every five sync blocks, so that the data will be reproduced in a data stream which is as close to the time flow of the original pictures as possible. The interchanged video data is sent to the multiplexer/demultiplexer 33.

The analog audio signals, sent from an outside microphone or a speech input terminal, are converted by the AD/DA converter 31 into digital data which then is sent to the audio data processor 32.

The audio data processor 32 converts the format of the input audio data into a data format conforming to the DV system, such as by packing on the sync block basis, to send the resulting data to the multiplexer/demultiplexer 33.

The main controller 15 sends the ancillary information, for recording as sub-code, ITI, video AUX or audio AUX, to the multiplexer/demultiplexer 33. For example, the main controller 15 sends the information on the track, video data titles or audio data titles, to the multiplexer/demultiplexer 33.

The multiplexer/demultiplexer 33 multiplexes the supplied video or audio data and the ancillary information to form one-track data of the DV system. The multiplexed data is sent to the ECC unit 34 in terms of one-track data of the DV system as a unit.

The ECC unit 34 appends the error correction code to the data supplied every track of the DV system. The ECC unit 34 appends an inner parity and an outer parity to each of the video data, audio data and to the ancillary information. The data having the error correction code appended thereto are sent to the 24/25 converter 35.

The 24/25 converter 35 24/25-converts the supplied data to superimpose pilot signals of the three frequencies f0, f1, f2 for ATF on these data. The 24/25 converter 35 records the pilot signals of respective different frequencies every track of the digital 8 mm system. Specifically, the same pilot signals are added every two-track data of the DV system. The 24/25 converted data is sent to the modulator/demodulator 36.

The modulator/demodulator 36 channel-codes the data for recording so as to convert the data string for conformity to the digital recording/reproducing system.

During recording, the DV data processor 12 outputs the data, processed as described above, as DV data.

The contents of processing by the DV data processor 12 during reproduction are hereinafter explained.

During reproduction, the DV data, read out by the write/readout unit 14 from the 8 mm tape 1, is sent to the DV data processor 12.

The modulator/demodulator 36 demodulates the channel-coded data to send the demodulated data to the 24/25 converter 35, which then removes the extra one bit previously appended to the 24 bits in the demodulated data. The 24/25 converter 35 sends the data freed of the extra bit to the ECC unit 34. The ECC unit 34 corrects the data for errors based on the error correction codes separately appended to the video data, audio data and the ancillary information. The data corrected for errors is sent to the multiplexer/demultiplexer 33.

The multiplexer/demultiplexer 33 separates the video data, audio data and the ancillary information, multiplexed every track of the DV system. The separated ancillary information is sent to the main controller 15. The separated audio data is processed by the audio data processor 32 and converted by the AD/DA converter 31 into analog signals which are outputted to outside. The separated video data is sent to the shuffling/deshuffling unit 28.

The video data is deshuffled by the shuffling/deshuffling unit 28, depacked by the fixed length unit 27 and dequantized by the quantizer/dequantizer 26 so as to be sent to the DCT/IDCT unit 25. The DCT/IDCT unit 25 then processes the input video data with IDCT to send the resulting IDCTed video data to the blocking/shuffling unit 23. The blocking/shuffling unit 23 deshuffles and deblocks the input video data to send the resulting video data to the D/A converter 22.

The D/A converter 22 converts the digital video data into analog video data which is outputted to an external equipment.

During reproduction, the DV data processor 12 reads out the DV data from the 8 mm tape 1 to output analog video and audio signals.

The structure and the processing contents of the write/readout unit 14 are further explained in detail.

Figure 12:
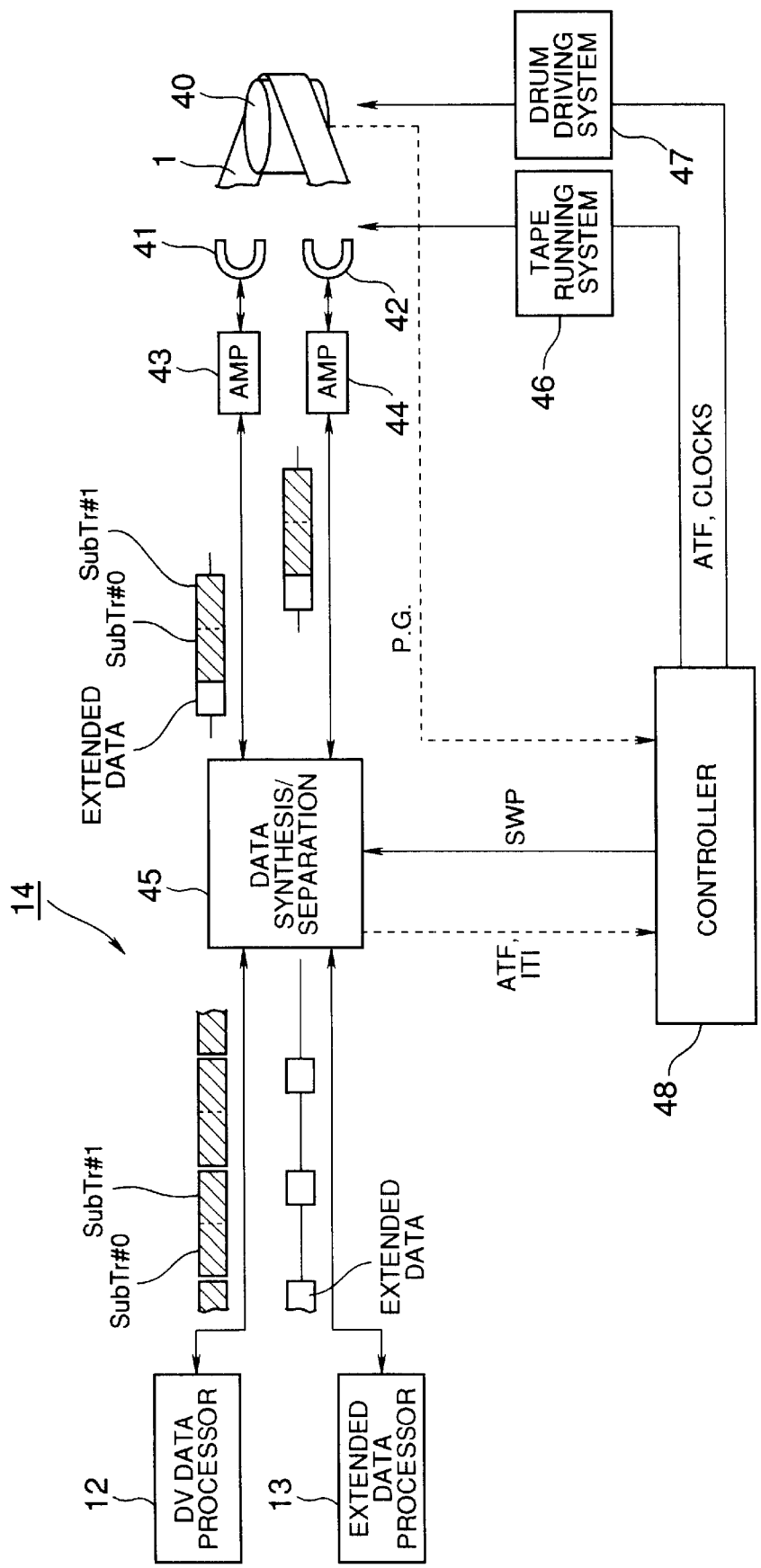
FIG. 12 is a block diagram of a writing/readout unit of a recording/reproducing apparatus embodying the present invention.

FIG. 12 is a block diagram of the write/readout unit 14.

The write/readout unit 14 includes a rotary drum 40, a first magnetic head 41 and a second magnetic head 42, provided on the rotary drum 40, a first amplifier 43 for driving the first magnetic head 41, a second amplifier 44 for driving the second magnetic head 42, a data synthesis/separation unit 45 for synthesizing and separating the DV data for recording and the extension data, a tape running system 46 for running the 8 mm tape 1, a drum driving system 47 for driving the rotary drum 40, and a controller 48.

On the rotary drum 40 is wrapped the 8 mm tape 1. On the rotary drum 40, the first magnetic head 41 and the second magnetic head 42 are mounted at 180° positions on either directly opposite sides of the center of rotation.

On rotation of the rotary drum 40, the first magnetic head 41 and the second magnetic head 42 are run on the 8 mm tape 1 at an angle of 4.8999° with respect to the longitudinal direction for signal recording/reproduction. The first magnetic head 41 and the second magnetic head 42 are alternately operated in a switching manner for signal recording or reproduction depending on the rotational position of the rotary drum 40. This switching is done in synchronism with the switching pulse SWP generated by the controller 48. The controller 48 generates the switching pulse SWP, switched between the high and the low periods, every 180° rotation of the rotary drum 40, based on a PG signal specifying the rotational phase of the rotary drum 40. For example, during the high period of the switching pulse, the first magnetic head 41 is selected to record or reproduce signals, whereas, during the low period of the switching pulse, the second magnetic head 42 is selected to record or reproduce signals.

During the usual recording and reproduction, the tape running system 46 runs the 8 mm tape 1 at a constant velocity.

During the usual recording and reproduction, the drum driving system 47 runs the rotary drum 40 in rotation at a constant rotational velocity of 4500 rpm.

During reproduction, the controller 48 controls the rotational phase of the rotary drum 40 for tracking control of the first magnetic head 41 and the second magnetic head 42. The rotational phase of the rotary drum 40 is controlled responsive to the ATF pilot signals detected by the data synthesis/separation unit 45. That is, there are superimposed the ATF pilot signals on the data recorded on each track. When the first magnetic head 41 or the second magnetic head 42 scans the track carrying the frequency f0, the controller 48 detects the pilot signals f1 and f2 from the neighboring tracks as cross-talk signals to apply tracking so that the pilot signals from the neighboring tracks will be equal to each other.

During reproduction or overwrite recording, the controller 48 detects the ITI and EX-ITI to control the recording position or the reproducing position of the magnetic head in the track. If only the audio data, only the video data, only the sub-code or only the extension data is to be rewritten, the controller 48 performs control so that data will start to be overwritten at a time point when the magnetic head reaches a predetermined position in a track and so that new data will not be written in other data portions. Specifically, when rewriting audio data of the usual area or video data of the usual area, the controller 48 detects the ITI recorded at the leading end of the track of the usual area to generate clocks to effect writing control of the rotary drum 40 and the first and second magnetic heads 41, 42. If the extension data of the extension area or the sub-code of the extension area are to be rewritten, the controller 48 detects the Ex-ITI recorded at the leading end of the track of the extension area to generate clocks to effect writing control of the rotary drum 40 and the first and second magnetic heads 41, 42.

If all data of the extension area is to be written from the state in which only data of the usual area is recorded and no data of the extension area is recorded, it is also possible to generate clocks using, for example, the ITI of the usual area of the previous track. In this case, errors may be feared to be produced since the distance from the detection of the ITI to the extension area is lengthened. However, in actuality, there is no such risk because a sufficient gap or guard is provided in the extension area.

During recording, the data synthesis/separation unit 45 is fed from DV data from the DV data processor 12, while being fed with extension data from the extension data processor 13. During recording, the data synthesis/separation unit 45 splits the DV data in two tracks of the DV system as units and synthesizes the split DV data and one track of the extension data to formulate one-track data of the digital 8 mm system. The data synthesis/separation unit 45 is responsive to the switching pulse SWP to switch between the magnetic heads to be used for recording to send the one-track data to the selected magnetic head.

During reproduction, the data synthesis/separation unit 45 is fed from the first magnetic head 41 and the second magnetic head 42 with data read out from the 8 mm tape 1. The data synthesis/separation unit 45 splits the one-track data sent from the magnetic heads 41, 42 into two-track data of the DV system read out from the usual area and the extension data read out from the extension area. The data synthesis/separation unit 45 sends the separated DV data to the DV data processor 12, while sending the separated extension data to the extension data processor 13 as the data synthesis/separation unit 45 switches between the magnetic heads to be used for readout depending on the switching pulse SWP.

The switching timing of the magnetic heads 41, 42 during the recording by the recording/reproducing apparatus 10 embodying the present invention is explained in comparison with the switching timing of the magnetic heads during recording of the recording/reproducing apparatus of the conventional DV system.

Figure 13:
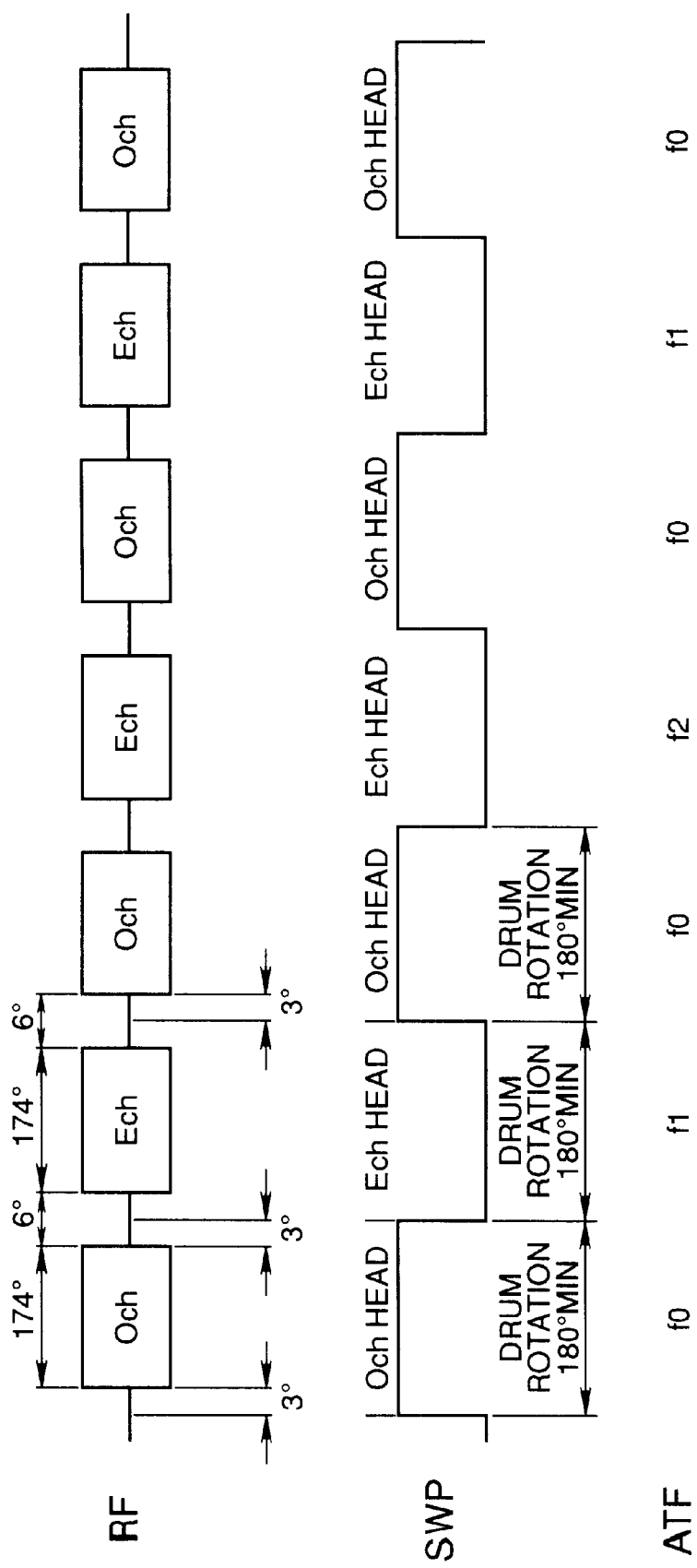
FIG. 13 illustrates the order of the switching timing and ATF pilot signals at the time of recording of the recording/reproducing apparatus of the DV system.
Figure 14:
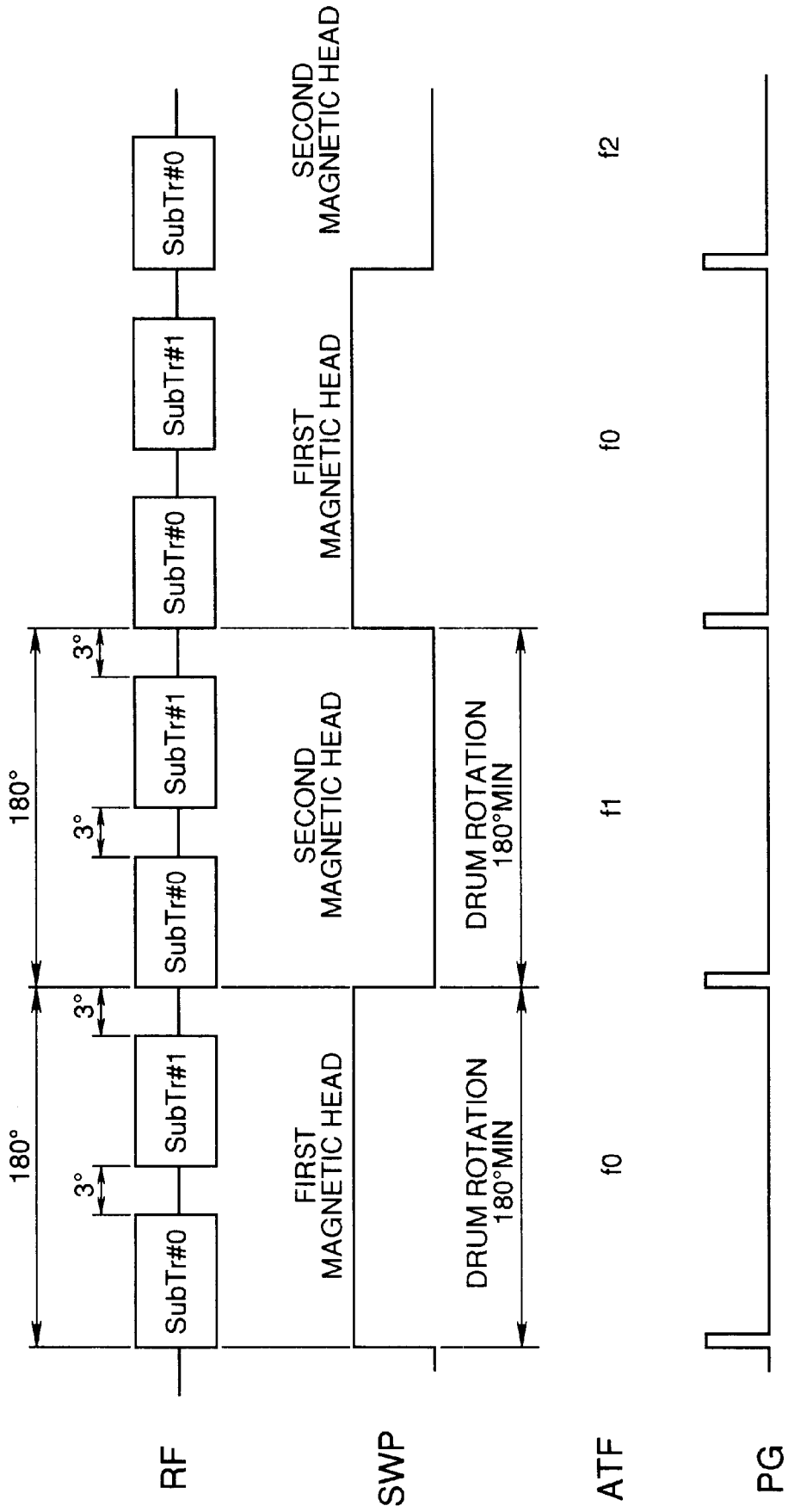
FIG. 14 illustrates the order of the switching timing and ATF pilot signals at the time of recording of the recording/reproducing apparatus embodying the present invention.

FIG. 13 shows the switching timing of the magnetic heads during recording of the recording/reproducing apparatus of the conventional DV system and the order of the ATF pilot signals. FIG. 14 shows the switching timing of the magnetic heads 41, 42 during recording of the recording/reproducing apparatus embodying the present invention and the order of the ATF pilot signals. It is noted that the diameter of the rotary drum is 21.7 mm and the number of revolutions of the drum is 9000 rpm in the case of the recording/reproducing apparatus of the conventional DV system and that the diameter of the rotary drum is 40 mm and the number of revolutions of the drum is 4500 rpm in the case of the present embodiment of the recording/reproducing apparatus.

First, in the case of the conventional recording/reproducing apparatus of the conventional DV system, shown in FIG. 13, the RF signals are recorded so that data of odd tracks (Och) and data of even tracks (Ech) are arrayed alternately, with the clock frequency of the RF signals (recording rate/head) being 41.85 Mbps. The RF signal of the odd tracks (Och) and the even tracks (Ech) are each of a length corresponding to 174° of the drum rotation angle, and are spaced apart from each other via an interval corresponding to 3° of the drum rotation angle.

The two heads, arranged on the rotary drum, operate as a head for the even tracks Ech and as a head for odd tracks Och, and are alternately in use on switching by head changeover switching pulse SWP each time the drum completes 180° rotation, as shown in FIG. 13

This records the RF signals of the odd tracks (Och) and the even tracks (Ech) on one track every 174° rotation of the rotary drum.

On the other hand, the ATF pilot signals in the recording/reproducing apparatus of the conventional recording/reproducing apparatus are recorded in the order of . . . f0, f1, f2, f0, f1, f2, . . . for respective ones of the alternately arrayed odd tracks (Och) and the even tracks (Ech).

In the present embodiment of the recording/reproducing apparatus 10, the clock frequency of the RF signals (recording rate/head) is 41.85 Mbps which is unchanged from that of the conventional DV system. In the first sub-track SubTr#0 and in the second sub-track SubTr#1, there are recorded data of the odd track (Och)and data of the even track (Ech) of the recording/reproducing apparatus of the conventional DV system, respectively. There is left a period corresponding to 3° of the wrap angle between the first sub-track SubTr#0 and the second sub-track SubTr#1, with the angle of rotation from the start position of the first sub-track SubTr#0 to the start position of the second sub-track SubTr#1 being 180°. Referring to FIG. 14, the two magnetic heads 41, 42, arranged on the rotary drum 40, are alternately in use on switching by the switching pulse SWP every channel of RF signals of a set of the sub-track SubTr#0 and the sub-track SubTr#.

That is, in the present embodiment of the recording/reproducing apparatus 10, RF signals of a set of the odd track Och and the even track Ech of the DV system are handled as a channel, so that, each time the drum makes a 180° revolution, a channel made up of these RF signals as the set are recorded as a track.

The ATF pilot signals in the recording/reproducing apparatus embodying the present invention are recorded in a repetitive pattern of f0, f1, f2, f0, f1, f2, . . . for the respective tracks comprised of alternate arrays of the channels each made up of the above-mentioned set of RF signals. A track pattern is formulated by interchanging the ATF pilot signals and head switching as described above.

In the recording/reproducing apparatus 10, embodying the present invention, data of the DV system can be recorded on a magnetic tape broader in tape width than the magnetic tape used in the DV system such as an 8 mm video tape. Moreover, the tape area can be exploited more effectively to assure recording for a longer time duration by recording two-tracks of data in the DV system on one track in succession without changing the data format. Conversely, for the same recording time duration, a shorter necessary tape length suffices than if the DV track patterns are recorded one-by-one on a broader tape, thus improving tape consumption.

Moreover, in the present embodiment of the recording/reproducing apparatus 10, the DV format signals can be recorded on the 8 mm video tape subject to simply changing the rpm of the drum of the pre-existing deck of the 8 mm tape recorder and to interchanged ATF pilot signals and switching pulses of the DV signal system, thus assuring effective utilization of the resources such as conventional components or production equipments of the video tapes.

Also, since the present embodiment of the recording/reproducing apparatus includes an extension area, audio or video data can be post-recorded without overwriting data recorded in the usual area. In particular, post-recording can be done reliably by having a sufficient gap and the track synchronization information for data of the extended area. In the conventional recording/reproducing apparatus 10, in which the sub-code is provided in the trailing end side of the track, it is difficult to rewrite only the sub-code due to linearity effects. In the present embodiment of the recording/reproducing apparatus 10, the sub-code can be easily rewritten by itself because the subcode of the extension area is provided in the vicinity of the extension ITI.

What is claimed is:

1. A magnetic recording apparatus for digital signals comprising:

recording data generating means for generating recording data associated with a digital recording format applied to a first magnetic tape of a pre-set tape width; and recording means for recording the recording data generated by said recording data generating means on a second magnetic tape having a tape width broader than that of said first magnetic tape;

said recording means recording at least two tracks of the recording data in the digital recording format generated by said recording data generating means in succession on a sole track formed on said second magnetic tape.

2. The magnetic recording apparatus according to claim 1 wherein said recording data generating means appends the same tracking pilot signals on at least two tracks of the recording data in the digital recording format recorded in succession on the sole track of said second magnetic tape.

3. The magnetic recording apparatus according to claim 1 wherein said recording means includes tape running means for running said second magnetic tape and a rotary drum carrying at least two magnetic heads and adapted for rotationally recording said recording data on said second magnetic tape and wherein at least two tracks of the recording data in said digital recording format are recorded on a sole track of said second magnetic tape by one of the magnetic heads arranged on said rotary drum.

4. The magnetic recording apparatus according to claim 1 wherein said recording data generating means generates recording data associated with the DV format;

said recording means recording at least two tracks of the recording data in the DV format generated by said recording data generating means in succession on a sole track formed on said second magnetic tape with a tape width of 8 mm.

5. A magnetic recording method for digital signals comprising:

generating recording data associated with a digital recording format applied to a first magnetic tape of a pre-set tape width; and recording at least two tracks of recording data in said digital recording format on a sole track formed on a second magnetic tape having a tape width broader than that of said first magnetic tape.

6. The magnetic recording method for digital signals according to claim 5 wherein the same tracking pilot signals are appended to at least two tracks of recording data in said digital recording format recorded in succession on a sole track of the second magnetic tape.

7. The magnetic recording method for digital signals according to claim 5 wherein said second magnetic tape is run to record on a sole track of said second magnetic tape at least two tracks of the recording data in said digital recording format by a sole magnetic head of at least two magnetic heads carried by a rotary drum.

8. The magnetic recording method for digital signals according to claim 5 further comprising:

generating recording data associated with the DV format; and recording at least two tracks of recording data in said DV format in succession on a sole track of a second magnetic tape with a tape width of 8 mm.

9. A magnetic reproducing apparatus for digital signals comprising:

reproducing means for reproducing recording data associated with a digital recording format applied to a first magnetic tape of a predetermined tape width from a second magnetic tape of a tape width broader than said predetermined tape width carrying said recording data; and data processing means for processing the recording data reproduced by said reproducing means;

said reproducing means reproducing at least two tracks of the recording data of said digital recording format in succession from a sole track formed on said second magnetic tape.

10. The magnetic reproducing apparatus for digital signals according to claim 9 wherein said reproducing means detects tracking pilot signals from at least two tracks of recording data in said digital recording format recorded in succession on a sole track of said second magnetic tape to effect tracking control of each track.

11. The magnetic reproducing apparatus for digital signals according to claim 9 wherein said reproducing means includes tape running means for running said second magnetic tape and a rotary drum carrying at least two magnetic heads and adapted for rotationally reproducing said recording data from said second magnetic tape, at least two tracks of the recording data in said digital recording format being reproduced from a sole track of said second magnetic tape by one of the magnetic heads arranged on said rotary drum.

12. The magnetic reproducing apparatus for digital signals according to claim 9 wherein said reproducing means reproduces at least two tracks of the recording data in the DV format in succession from a sole track formed on a second magnetic tape having a tape width of 8 mm;

said data processing means processing the recording data of the DV format reproduced by said reproducing means.

13. A magnetic reproducing method comprising:

reproducing at least two tracks of data in the digital recording format in succession from a sole track formed on a second magnetic tape carrying recording signals of the digital recording format applied to a first magnetic tape of a predetermined tape width, said second magnetic tape having a tape width broader than said predetermined tape width; and processing reproduced recording data.

14. The magnetic reproducing method according to claim 13 wherein tracking pilot signals are detected from at least two tracks of the recording data in said digital recording format recorded in succession on a sole track of the second magnetic tape.

15. The magnetic recording method for digital signals according to claim 13 wherein said second magnetic tape is run to rotationally reproduce at least two tracks of the recording data in said digital recording format from a sole track of said second magnetic tape by a sole magnetic head of at least two magnetic heads carried by a rotary drum.

16. The magnetic recording method for digital signals according to claim 13 wherein at last two tracks of recording data in the DV format are reproduced in succession from a sole track formed on a second magnetic tape with a tape width of 8 mm; and wherein recording data associated with said DV format are processed.

* * * * *